US010658902B2

(12) United States Patent
King et al.

(10) Patent No.: US 10,658,902 B2
(45) Date of Patent: May 19, 2020

(54) AXIAL BRUSHLESS DC MOTOR

(71) Applicant: CTS Corporation, Lisle, IL (US)

(72) Inventors: Yulanda Y H W King, Amherst, NY (US); David Kolberg, Granger, IN (US); Douglas E. Cors, Elkhart, IN (US); Scott Calkins, Elkhart, IN (US); Eric Andrina, Niles, MI (US); Kevin C. Wolschlager, Elkhart, IN (US); William S. Stewart, Elkhart, IN (US)

(73) Assignee: CTS Corporation, Lisle, IL (US)

( * ) Notice: Subject to any disclaimer, the term of this patent is extended or adjusted under 35 U.S.C. 154(b) by 0 days.

(21) Appl. No.: 16/206,499

(22) Filed: Nov. 30, 2018

(65) Prior Publication Data

US 2019/0097494 A1 Mar. 28, 2019

Related U.S. Application Data

(63) Continuation of application No. 15/017,237, filed on Feb. 5, 2016, now Pat. No. 10,148,152.

(51) Int. Cl.
*H02K 7/08* (2006.01)
*H02K 1/27* (2006.01)
(Continued)

(52) U.S. Cl.
CPC ........... *H02K 7/083* (2013.01); *F16C 19/163* (2013.01); *F16C 19/543* (2013.01);
(Continued)

(58) Field of Classification Search
None
See application file for complete search history.

(56) References Cited

U.S. PATENT DOCUMENTS 1,977,184 A 10/1934 Haydon
2,699,365 A 1/1955 Indergand et al.
(Continued)

FOREIGN PATENT DOCUMENTS

JP S63277455 A 11/1988
JP H01315244 A 12/1989
(Continued)

OTHER PUBLICATIONS

Brushless DC Motor, All About Circuits, 2014, Chapter 13, vol. II.
CTS Series 647/648 Radial Brushless DC Motor, 2012/2013.

*Primary Examiner* — Terrance L Kenerly
(74) *Attorney, Agent, or Firm* — Daniel Deneufbourg

(57) ABSTRACT

An axial brushless DC motor comprising a stator, a rotor including a magnet, a sleeve bushing extending through the stator and including a pair of opposed distal collars, a motor shaft extends through the sleeve bushing, and a pair of opposed bearings are seated in the respective pair of collars and mount the shaft and a rotor for rotation relative to the sleeve bushing and the stator. The bearings are adapted for thrust, radial support/self-alignment, and angular adjustment of the motor shaft. In one embodiment, a stator overmold member includes a central tube that defines the sleeve bushing and includes a stator shorting ring. In one embodiment, a metal pole piece is seated in a cup-shaped magnet with a rim and the magnetic flux travels through the rim of the magnet and through a magnetic flux sensor.

9 Claims, 7 Drawing Sheets

(51) Int. Cl.
  H02K 21/24 (2006.01)
  H02K 1/18 (2006.01)
  H02K 3/52 (2006.01)
  H02K 5/173 (2006.01)
  H02K 15/12 (2006.01)
  F16C 19/16 (2006.01)
  F16C 19/54 (2006.01)
  F16C 33/58 (2006.01)

(52) U.S. Cl.
  CPC ........... *F16C 33/585* (2013.01); *H02K 1/182* (2013.01); *H02K 1/2793* (2013.01); *H02K 3/522* (2013.01); *H02K 5/1735* (2013.01); *H02K 7/085* (2013.01); *H02K 15/12* (2013.01); *H02K 21/24* (2013.01); *F16C 2380/26* (2013.01)

(56) References Cited

U.S. PATENT DOCUMENTS

| | | | |
|---|---|---|---|
| 2,703,737 A | 3/1955 | Turner | |
| 3,845,339 A * | 10/1974 | Merkle | H02K 3/46 310/156.34 |
| 3,936,685 A | 2/1976 | Glockner et al. | |
| 4,174,484 A * | 11/1979 | Schmider | G01P 3/481 310/268 |
| 4,394,594 A * | 7/1983 | Schmider | H02K 29/08 310/156.34 |
| 4,398,773 A | 8/1983 | Boden et al. | |
| 4,435,673 A | 3/1984 | Hagino et al. | |
| 4,529,900 A | 7/1985 | Uzuka | |
| 4,585,979 A | 4/1986 | Sakamoto et al. | |
| 4,739,867 A | 4/1988 | Harrington | |
| 4,839,585 A | 1/1989 | Bicknell | |
| 4,949,000 A * | 8/1990 | Petersen | G11B 19/2009 29/596 |
| 5,101,131 A | 3/1992 | Ushiro et al. | |
| 5,828,151 A | 10/1998 | Bustamante et al. | |
| 5,923,110 A | 1/1999 | Zhao et al. | |
| 5,880,551 A | 3/1999 | Prudham | |
| 6,097,121 A | 8/2000 | Oku | |
| 6,246,137 B1 | 1/2001 | Obara | |
| 6,222,288 B1 | 4/2001 | Izquierdo et al. | |
| 6,441,530 B1 | 8/2002 | Petersen | |
| 6,605,883 B2 | 8/2003 | Isozaki et al. | |
| 6,891,343 B2 * | 5/2005 | Petersen | H02K 21/12 318/400.11 |
| 6,995,494 B2 | 2/2006 | Haugan et al. | |
| 7,049,723 B2 | 5/2006 | Suzuki et al. | |
| 7,816,882 B2 | 10/2010 | Nashiki et al. | |
| 8,415,885 B2 | 4/2013 | Li et al. | |
| 2005/0147512 A1 | 7/2005 | Chen et al. | |
| 2006/0279150 A1 | 12/2006 | Kojima | |
| 2008/0061649 A1 | 3/2008 | Kim | |
| 2009/0033159 A1 | 2/2009 | West | |
| 2009/0189471 A1 | 7/2009 | Amano et al. | |
| 2011/0293213 A1 | 12/2011 | Eichelmann | |
| 2013/0009508 A1 | 1/2013 | Takamatsu et al. | |
| 2014/0001902 A9 | 1/2014 | Camilleri et al. | |
| 2014/0265653 A1 | 9/2014 | Heins et al. | |
| 2018/0062479 A1* | 3/2018 | Stewart | H02K 1/2793 |

FOREIGN PATENT DOCUMENTS

| | | |
|---|---|---|
| WO | 2011/040267 A1 | 4/2011 |
| WO | 2013/088670 A1 | 6/2013 |

\* cited by examiner

AXIAL BRUSHLESS DC MOTOR

CROSS-REFERENCE TO RELATED AND CO-PENDING APPLICATIONS

This patent application is a continuation application that claims priority and benefit of the filing date of U.S. patent application Ser. No. 15/017,237 filed on Feb. 5, 2016, the disclosure and contents of which is expressly incorporated herein in its entirety by reference.

FIELD OF THE INVENTION

The present invention relates generally to a motor and, in particular, to an axial brushless DC motor.

BACKGROUND OF THE INVENTION

There is a continued need for smaller and more cost effective axial brushless DC motors that provide the same output performance as larger and less cost effective axial brushless DC motors. The present invention satisfies this need.

SUMMARY OF THE INVENTION

The present invention is generally directed to an axial brushless DC motor comprising a stator, a rotor including a magnet, an elongate sleeve bushing extending through the stator, the sleeve bushing defining an interior through-aperture and including first and second opposed distal bearing collars, an elongate shaft extending through the interior through-aperture of the sleeve bushing, a first bearing in the first bearing collar in the sleeve bushing and surrounding a first end of the shaft for allowing the rotation of the shaft relative to the sleeve bushing and the stator, and a second bearing in the second bearing collar in the sleeve bushing and surrounding a second opposed end of the shaft for allowing the rotation of the shaft and the rotor relative to the stator.

In one embodiment, the second bearing is a thrust ball bearing including balls sandwiched between opposed upper and lower bearing races, the upper and lower bearing races including respective collars having respective ball bearing abutment surfaces that allow for the combination of thrust, radial support/self-alignment, and angular adjustment of the bearing races relative to each other and the shaft supported by the thrust ball bearing.

In one embodiment, the second bearing is a thrust ball bearing including balls sandwiched between opposed upper and lower bearing races, the upper and lower bearing races including respective collars having respective ball bearing abutment surfaces, one of the upper and lower bearing abutment surfaces following the contour of the balls and the other of the upper and lower ball bearing abutment surfaces being an angled and flat surface.

In one embodiment, the ball bearing abutment surface on the upper bearing race follows the contour of the balls and the ball bearing abutment surface on the lower bearing race is angled and flat to allow for the combination of thrust, self-centering, radial support, and alignment of the bearing races relative to each other and the shaft that is supported by the thrust bearing.

In one embodiment, the ball bearing abutment surface on the upper bearing race is angled and flat and the ball bearing abutment surface on the lower bearing surface follows the contour of the balls to allow the combination of thrust, radial support, and self-alignment of the bearing races relative to each other and the shaft that is supported by the thrust bearing.

In one embodiment, the first and second bearings are located in the first and second bearing collars in a back-to-back relationship.

In one embodiment, a stator overmold member surrounds the coils and defining the sleeve bushing and a housing for the rotor.

In one embodiment, a stator shorting ring includes respective terminals coupled to the respective coils, the stator shorting ring extending in the stator overmold member.

In one embodiment, the stator includes a plurality of coils arranged in respective pairs of coils connected in parallel.

In one embodiment, the stator includes a plurality of coils arranged in respective pairs of coils connected in series.

In one embodiment, a cup-shaped magnet defines a receptacle for a disc-shaped metal pole piece.

In one embodiment, the cup-shaped magnet includes a rim and is adapted to generate a magnetic flux, the magnetic flux being adapted to travel through the rim of the magnet and through a magnetic flux sensor.

In one embodiment, the metal pole piece defines a notch in a peripheral region thereof located adjacent the rim of the magnet for enhancing the density of the magnetic flux in the region of the rim of the magnet and the magnetic flux sensor.

The present invention is also directed to an axial brushless DC motor comprising a stator including a plurality of coils, a stator overmold member surrounding the coils and defining a sleeve bushing including first and second bearing collars and a housing for the rotor, a rotor including a magnet and located in the rotor housing defined in the stator overmold member, a motor shaft extending through the sleeve bushing of the stator overmold assembly and coupled for rotation to and with the rotor, and first and second bearings seated in the respective first and second bearing collars in the sleeve bushing of the stator overmold assembly and mounting the motor shaft in the motor for rotation with the rotor relative to the stator.

In one embodiment, a stator shorting ring includes terminals coupled to the coils, the stator over mold member surrounding the stator shorting ring.

The present invention is further directed to an axial brushless DC motor comprising a stator, a rotatable motor shaft extending through the stator, and a rotor overlying and spaced from the stator and coupled for rotation with the motor shaft, the rotor including a magnet that generates a magnetic flux adapted for sensing by a magnetic flux sensor, the magnet including a rim and the magnetic flux sensor overlying and spaced from the rim of the magnet, the magnetic flux being adapted to travel through the rim of the magnet and the magnetic flux sensor.

In one embodiment, the magnet is in the shape of a cup including the rim and further comprising a metal pole piece seated in the cup-shaped magnet and includes a peripheral notch formed therein in a region of the magnet pole piece adjacent the rim of the magnet for enhancing the density of the magnetic flux in the region of the rim and the magnetic flux sensor.

There are other advantages and features of this invention which will be more readily apparent from the following description of the embodiment of the invention, the drawings, and the appended claims.

BRIEF DESCRIPTION OF THE DRAWINGS

In the accompanying drawings that form part of the specification, and in which like numerals are employed to designate like parts throughout the same.

DETAILED DESCRIPTION OF THE EMBODIMENTS

Figure 1:
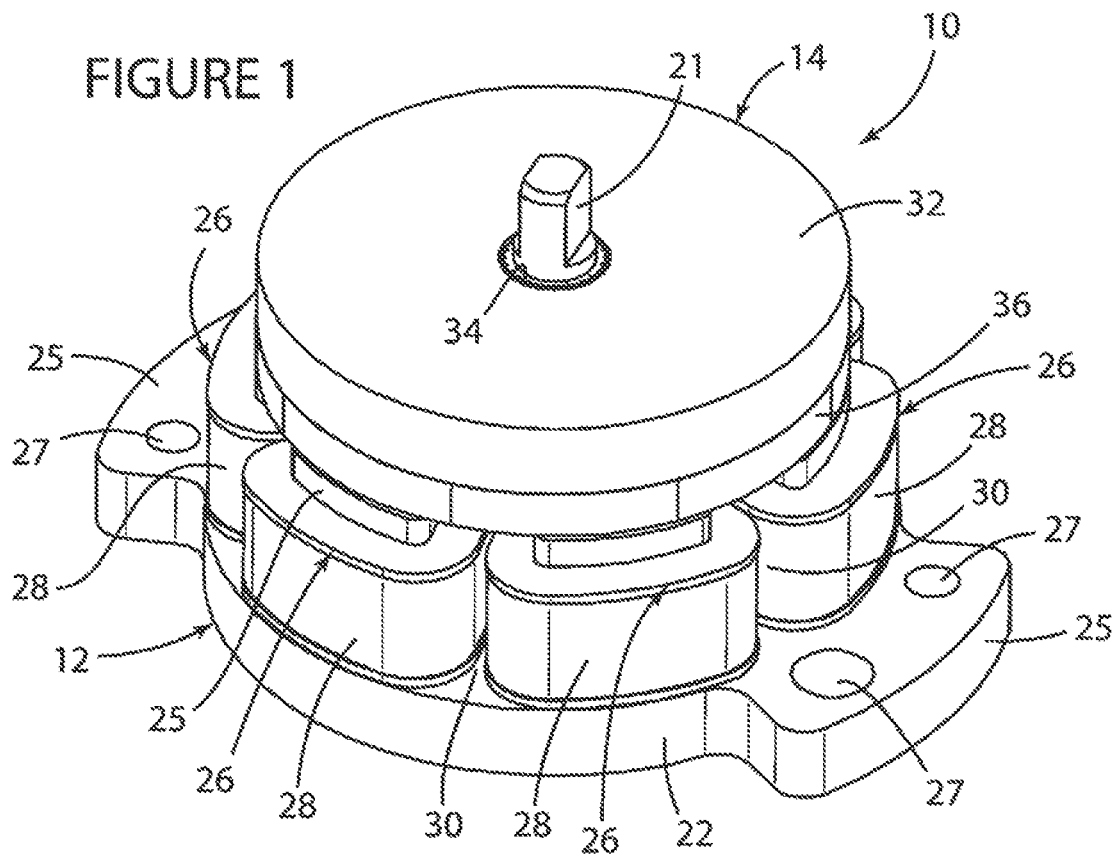
FIG. 1 is a perspective view of an axial brushless DC motor in accordance with the present invention.
Figure 2:
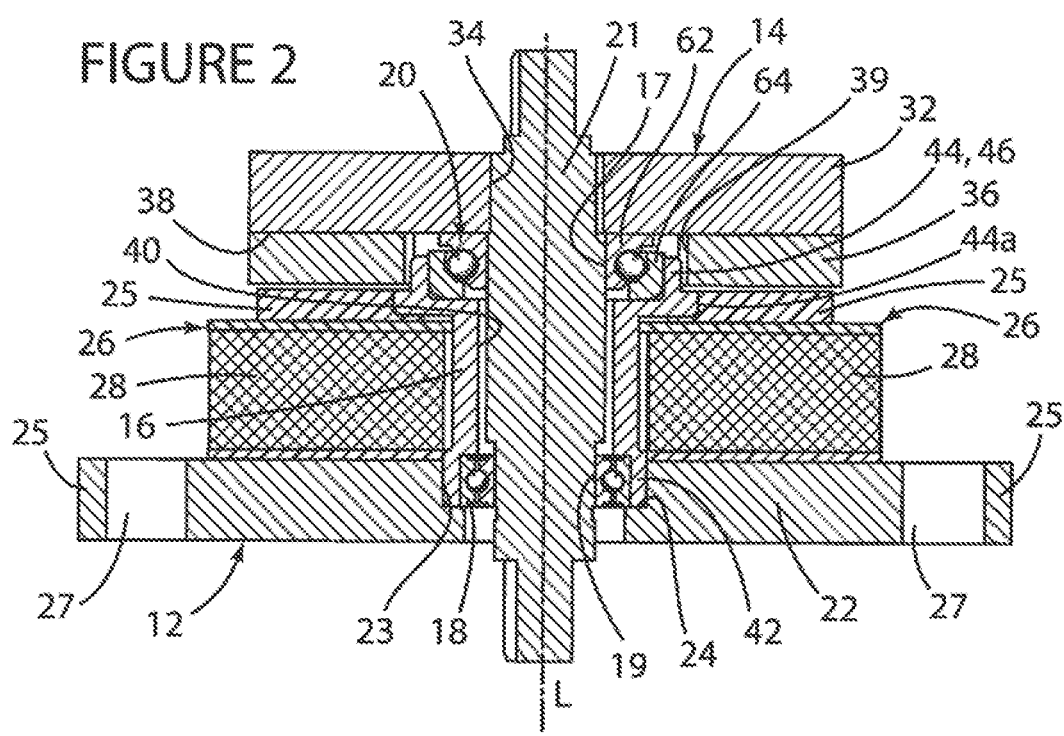
FIG. 2 is a vertical cross-sectional view of the axial brushless DC motor in accordance with the present invention.
Figure 3:
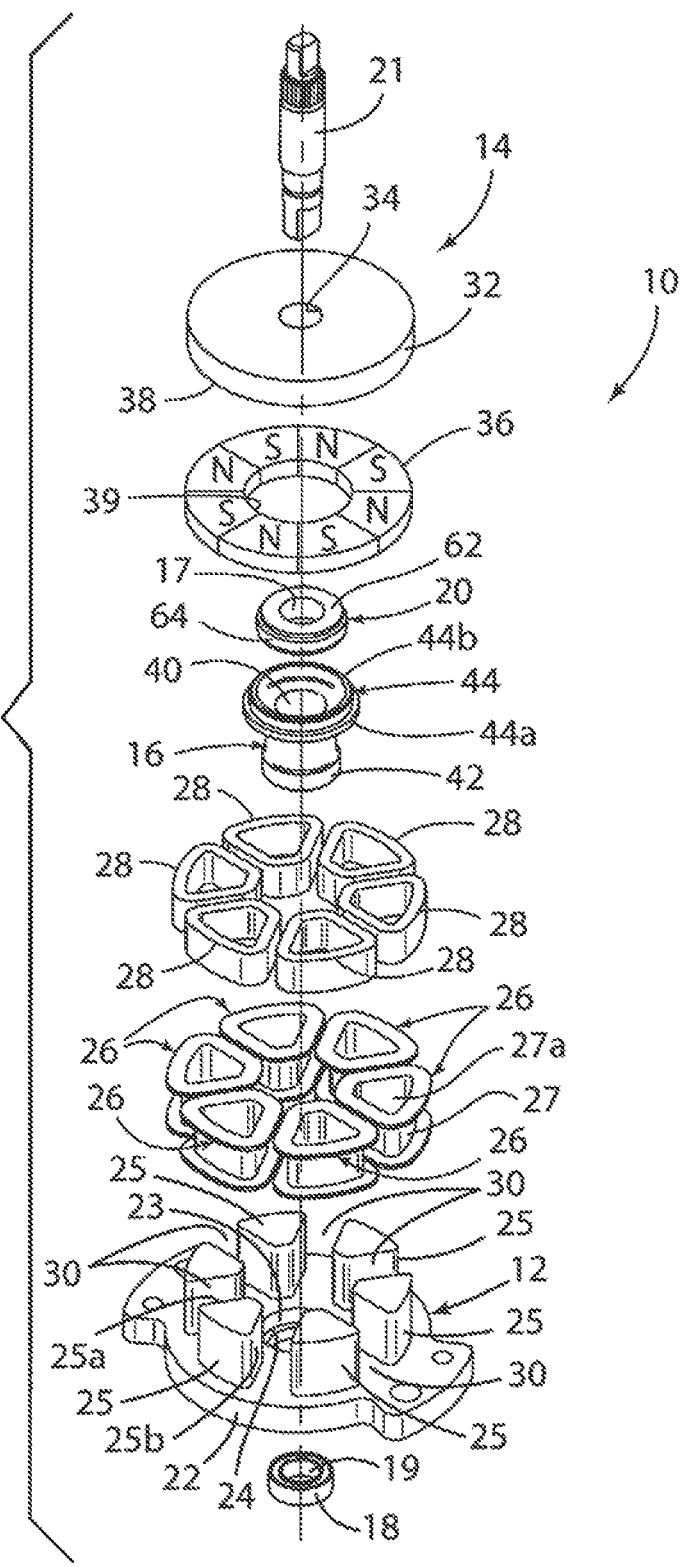
FIG. 3 is an exploded view of the axial brushless DC motor in accordance with the present invention.

FIGS. 1, 2, and 3 depict an axial brushless DC motor 10 in accordance with the present invention which comprises a stator or stator assembly 12, a rotor or rotor assembly 14, a sleeve bushing 16, a ball bearing 18, a thrust bearing 20, and an elongate motor shaft 21. In the embodiment shown, the axial brushless DC motor 10 is a three phase, eight pole, six slot axial brushless DC motor.

The stator assembly 12 includes a flat base 22 in the form and shape of a disc defining a central through-hole or aperture 23, an interior circumferential shoulder 24 defined by the interior wall of the base 22 defining the central through-hole 23 thereof, and a plurality of peripheral motor mounting brackets 25 each defining a plurality of motor mounting through-holes 27. In the embodiment shown, the base 22 is made from a powder metal. A plurality of stator armature posts 25, namely six in the embodiment of FIGS. 1, 2, and 3, protrude unitarily normally upwardly and outwardly from the interior face of the base 22. In the embodiment shown, the armature posts 25 are generally triangular in shape and extend full circle around the central through-hole or aperture 23 in a spaced apart relationship relative to each other and the central through-hole or aperture 23. Also, in the embodiment shown, the respective side faces 25a and 25b of each of the armature posts 25 converge inwardly towards each other and in the direction of the central through-hole or aperture 23.

The stator assembly 12 also includes a plurality of elongate thermoplastic bobbins 26 each defining a central elongate core or spool 27 defining a central elongate through-hole 27a. The central elongate core or spool 27 is of a triangular shape complementary with the triangular shape of the respective armature posts 25.

Electrical coil packs 28 extend around the core or spool 27 of the bobbins 26 respectively. The bobbins 26 are positioned on the base 22 relative to each other such that a slot or gap 30 is defined between each of the bobbins 26 and coils 28. The embodiment shown defines six slots or gaps 30.

The rotor assembly 14 includes a flat base 32 in the form and shape of a disc defining a central through-hole or aperture 34. The base 32 is made from powder metal. A flat magnet 36 is seated against the exterior surface of the bottom face 38 of the rotor base 32. In the embodiment shown, the magnet 36 is in the form and shape of a disc and defines a central through-hole or aperture 39 having a diameter greater than and spaced from the central through-hole or aperture 34 defined in the rotor base 32. In the embodiment shown, the magnet 36 is made of compression bonded Neo Ferrite magnetic material and is comprised of eight alternating N-S poles.

The rotor assembly 14 and the stator assembly 12 are positioned relative to each other in an overlapping relationship with the exterior top face of the magnet 36 of the rotor assembly 14 positioned opposite, spaced from, and parallel to, the exterior top face of the armature posts 25, bobbins 26, and the coils 28 of the stator assembly 12. In this relationship, the two pairs of coils 28 (or four coils or two phases) are energized in response to the rotation of the rotor assembly 14 and the magnet 36 at any commutation stage.

The Estimated Peak Torque Constant per phase for the motor 10 is:

$$K_T(Nm/At) \text{ is about } B_{air}*(OD^2-ID^2)/4$$

where:
$K_T$ (Nm/At)—Peak Torque Constant
$B_{air}$ (T)—Magnet Flux Density in the Air Gap
OD (m)—Stator and Magnet OD
ID (m)—Magnet ID The sleeve bushing 16, the bearings 18 and 20, and the motor shaft 21 are assembled in a relationship that allows for rotation of the rotor assembly 14 relative to the stator assembly 12 in response to the rotation of the motor shaft 21.

The elongated sleeve bushing 16 defines an interior elongated hollow cylindrical bore 40. Radial bearing receiving collars 42 and 44 are formed at opposite ends of the sleeve bushing 16 and are adapted to receive and seat the ball bearing 18 and the thrust bearing 20 respectively. The radial collars 42 and 44 have diameters greater than the diameter of the sleeve bushing 16. The upper collar 44 includes a radial portion 44a that extends radially outwardly and normally from the sleeve bushing 16 and an axial portion 44b that extends outwardly and upwardly from the distal end of the radial portion 44a.

The sleeve bushing 16 extends through the center of the motor 10 in a relationship wherein the sleeve bushing 16 is surrounded by the stator armature posts 25, the bobbins 26, and the coils 28; the collar 42 is located in the central through-hole 23 defined in the base 22 of the stator assembly 12 and seated against the interior shoulder 24 of the stator base 22; and the collar 44 is located in the through-hole 38 defined in the magnet 36. More specifically, the collar 44 is positioned in a relationship with the radial portion 44a located between the bobbins 26/coils 28 and the magnet 36 and the axial portion 44b extending into the interior of the through-hole 38. Thus, the sleeve bushing 16 extends through the center of the motor 10 and through the stator 12 in a relationship co-linear with the longitudinal axis L of the motor 10.

The motor shaft 21, which is elongate and generally cylindrical in shape, extends through the center of the motor 10 and more specifically extends through the interior bore 40 of the sleeve bushing 16. A first end of the motor shaft 21 extends through the through-hole 23 defined in the center of the base 22 of the stator assembly 12 and an opposite second end that extends through the through-hole 34 defined in the center of the magnet 32 of the rotor assembly 14.

The radial bearing 18 is in the form and shape of a ring and defines a central through-aperture 19. The radial bearing 18 is nested in the collar 42 of the sleeve bushing 16 and is located and mounted in the motor 10 in a relationship wherein the radial bearing 18 surrounds the lower end of the motor shaft 21 and the collar 42 of the sleeve bushing 16 surrounds the radial bearing 18 thereby mounting the lower end of the motor shaft 21, and thus the motor shaft 21, in the motor 10 for rotation relative to the sleeve bushing 16 and the stator assembly 12.

The bearing 20 is a combination thrust and radial bearing that is also in the form and shape of ring defining a central through-aperture 17 and is nested and seated in the interior of the upper collar 44 of the sleeve bushing 16 and in a relationship surrounding the upper end of the motor shaft 21 thereby mounting the upper end of the motor shaft 21, and thus the motor shaft 21 and the rotor 14, for rotation relative to the sleeve bushing 16 and the stator 12.

Figure 4:
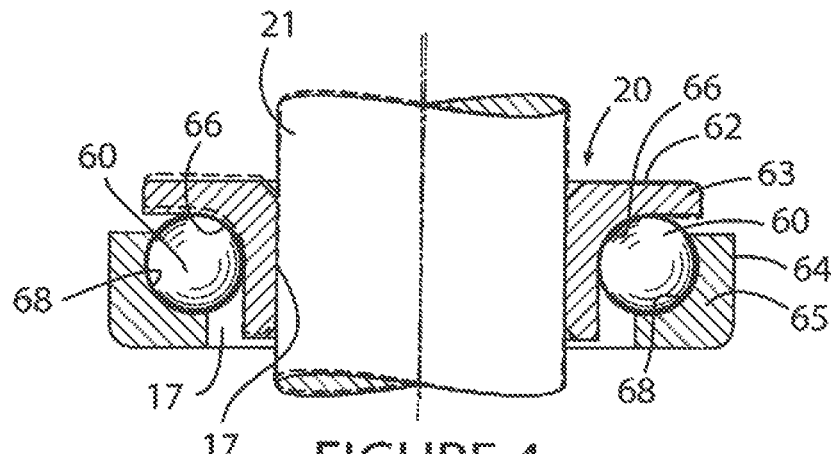
FIG. 4 is an enlarged vertical cross-sectional view of one embodiment of the thrust/radial bearing of the axial brushless DC motor in accordance with the present invention.

The bearing 20 is shown in more detail in FIG. 4 and includes a combination of thrust, radial support/self-alignment, and angular adjustment features.

Figure 5:
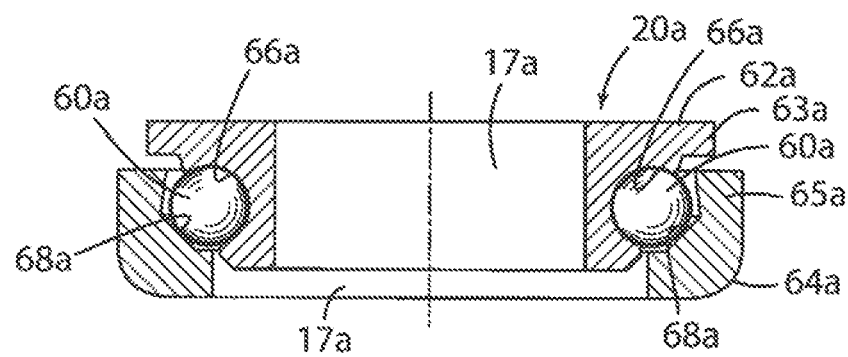
FIG. 5 is an enlarged vertical cross-sectional view of another embodiment of the thrust/radial bearing of the axial brushless DC motor in accordance with the present invention.

The bearing 20a shown in FIG. 5 is a bearing that includes a combination of thrust, self-centering, radial support, and alignment features.

Figure 6:
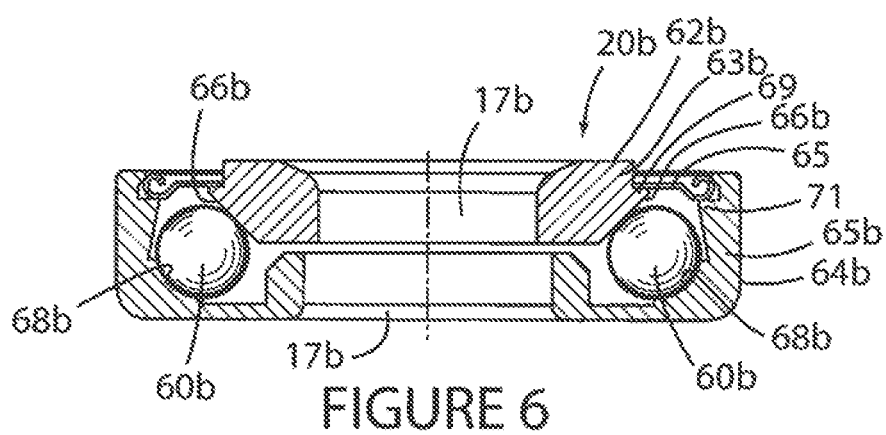
FIG. 6 is an enlarged vertical cross-sectional view of a further embodiment of the thrust/radial bearing of the axial brushless DC motor in accordance with the present invention.

The bearing 20b shown in FIG. 6 is a bearing that includes a combination of thrust, radial support, and self-alignment features.

The structure of the thrust bearings 20, 20a, and 20b allows for the combination thrust, radial support, radial alignment, and angular adjustment features to be incorporated into a single bearing.

The thrust bearing 20 must include at least the thrust feature and one of the other features of the thrust bearings shown in FIGS. 4, 5, and 6 to assure the proper rotation of the rotor assembly 14 and the shaft 21 in response to the centrifugal forces and acceleration when the rotor assembly 14 and the shaft 21 are rotated at a relatively high speed and thus assuring the proper function of the motor 10.

Each of the thrust bearings 20, 20a, and 20b prevents movement of the rotor assembly 14 and the motor shaft 21 in the X-Y plane and thus making the rotor assembly 14 and the motor shaft 21 suitable and adapted for high speed and continuous rotation.

The bearing 20 shown in FIG. 4 is comprised of a plurality of metal balls 60 sandwiched between a pair of stacked and generally ring shaped upper and lower bearing races 62 and 64 each defining respective central through-apertures 17 and including respective peripheral and circumferentially extending collars 63 and 65 having respective arcuate exterior side surfaces defining respective ball bearing receiving recesses or nests 66 and 68.

In the embodiment of FIG. 4, the collar 63 of the race 62 extends into the interior 17 of the collar 65 of the race 64 and the arcuate surfaces defining the respective nests 66 and 68 are positioned in an opposed relationship and are complementary to and follow the contour of opposed regions of the exterior surface of the ball bearings 60. In the embodiment of FIG. 4, the respective surfaces defining the respective nests 66 and 68 are formed and curved to allow approximately one half of the opposed regions of the exterior surface of the respective balls 60 to be nested therein in a relationship with the upper exterior surface of the balls 60 nested in the nesting surface 66 of the collar 63 of the race 62 and the lower exterior surface of the balls 60 nested in the nesting surface 68 of the collar 65 of the race 64.

The combination of the use of nests 66 and 68 on the respective bearing races 62 and 64 with a shape that follows the contour of the balls 60 allows the bearing 20 and the bearing races 62 and 64 to serve a combination of thrust, radial support/self-alignment, and angular adjustment functions (as shown in phantom in FIG. 4 which shows the bearing race 62 of the bearing 20 and the shaft 21 positioned at an angle relative to the bearing race 64 and the bearing central vertical axis) relative to each other and the motor shaft 21 and rotor 14 that is supported by the bearing 20.

The bearing 20a shown in FIG. 5 is comprised of metal balls 60a sandwiched between a pair of stacked and generally ring shaped upper and lower bearing races 62a and 64a each defining respective central through-apertures 17a and including respective peripheral and circumferentially extending collars 63a and 65a having respective exterior side surfaces defining respective opposed ball bearing abutment surfaces 66a and 68a.

In the embodiment of FIG. 5, the collar 63a of the race 62a extends into the interior through-aperture 17a of the collar 65a of the race 64a; the surface 66a on the bearing race 62a is in the form and shape of a nest that is complementary to and follows the contour of the lower exterior surface of the balls 60a and, more specifically, in a form and shape that allows approximately one half of the lower exterior surface of the respective balls 60a to be nested therein; and the surface 68a on the bearing race 64a is angled and flat.

Thus, in the embodiment of FIG. 5, the respective balls 60a are nested between the respective races 62a and 64a in a relationship with the upper exterior surface of the respective balls 60a nested in the exterior surface 66a of the collar 63a of the race 62a and the lower exterior surface of the respective balls 60a abutted against the angled and flat abutment exterior surface 68a of the collar 65a of the race 64a.

The combination of the use of ball bearing abutment surfaces 66a and 68a with the shape and configuration as shown in FIG. 5 allows the bearing 20a and the bearing races 62a and 64a to serve a combination of thrust, self-centering, radial support, and alignment functions relative to each other and the motor shaft 21 and the rotor 14 that is supported by the bearing 20a.

The bearing 20b shown in FIG. 6 is comprised of metal balls sandwiched between a pair of stacked and generally ring shaped bearing races 62b and 64b each defining an interior through-aperture 17b and including respective peripheral and circumferentially extending collars 63b and 65b having respective exterior side surfaces defining respective ball bearing abutment surfaces 66b and 68b. In the embodiment of FIG. 6, the collar 63b of the race 62b extends and is located in the interior of the collar 65b of the race 64b; the surface 66b on the bearing race 62b is angled and flat;

and the surface 68b on the bearing race 64b is in the form and shape of a nest that follows the contour of the exterior surface of the balls 60b and allows approximately one quarter of the exterior surface of the balls 60b to be nested therein.

Thus, in the embodiment of FIG. 6, the respective balls 60b are nested between the respective races 62b and 64b in a relationship with the upper exterior surface of the respective balls 60b abutted against the exterior surface 66b of the collar 63b of the race 62b and the lower exterior surface of the respective balls 60b nested in the surface 68b of the collar 65b of the race 64b.

The bearing 20b further comprises a ring spring 65 extending and located between a peripheral and circumferentially extending shoulder 69 defined and formed on the exterior surface of the collar 63b of the race 62b and a peripheral and circumferentially extending shoulder 71 defined and formed on the exterior surface of the collar 65b of the race 64b.

The combination of the use of ball bearing abutment surfaces 66b and 68b with the shape and configuration as shown in FIG. 6 allows the bearing 20b and the bearing races 62b and 64b to serve a combination of thrust, radial support, and self-alignment functions relative to each other and the motor shaft 21 that is supported by the bearing 20b.

The respective bearings 20, 20a, and 20b are mounted in the collar 44 of the sleeve bushing 16 in a relationship wherein, during operation of the motor 10, the respective bearing races 62, 62a, and 62b rotate relative to the respective bearing races 64, 64a, and 64b to allow the rotation of the motor shaft 21 and the rotor assembly 14 relative to the stator assembly 12.

Figure 7:
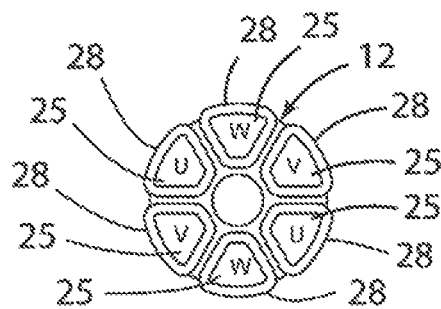
FIG. 7 is a simplified top plan view of the stator of the axial brushless DC motor in accordance with the present invention.
Figure 8:
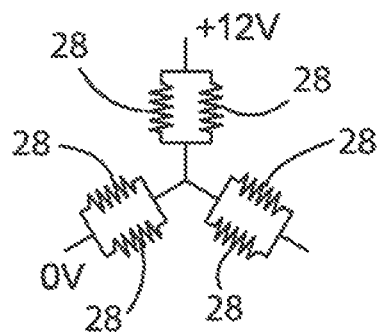
FIG. 8 is a schematic diagram of an electrical circuit for the parallel connection and coupling of the coils of the stator of the axial brushless DC motor in accordance with the present invention.

FIG. 8 depicts the parallel circuit schematic and arrangement of the axial motor 10 shown in FIGS. 1, 2, and 3 with the stator coil arrangement shown in FIG. 7.

Specifically, FIG. 8 depicts the coils 28 arranged on the stator 12 in a relationship wherein respective pairs of the coils 28 define the respective phases U, V, and W of the stator 12 with the pair of coils 28 defining the U phase positioned in an opposing and co-linear relationship, the pair of coils 28 defining the V phase positioned in an opposing and co-linear relationship, the pair of coils 28 defining the W phase positioned in an opposing and co-linear relationship, and the coils 28 extending around the stator 12 in an alternating phase relationship with the V phase coils 28 located between the U and W phase coils 28.

Specifically, FIG. 8 shows the two coils 28 defining the U phase connected in parallel, the two coils 28 defining the V phase connected in parallel, and the two coils 28 defining the W phase connected in parallel.

Figure 9:
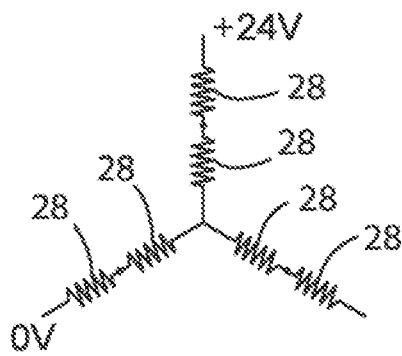
FIG. 9 is a schematic diagram of an electrical circuit of the series connection and coupling of the coils of the stator of the axial brushless DC motor in accordance with the present invention.
Figure 10:
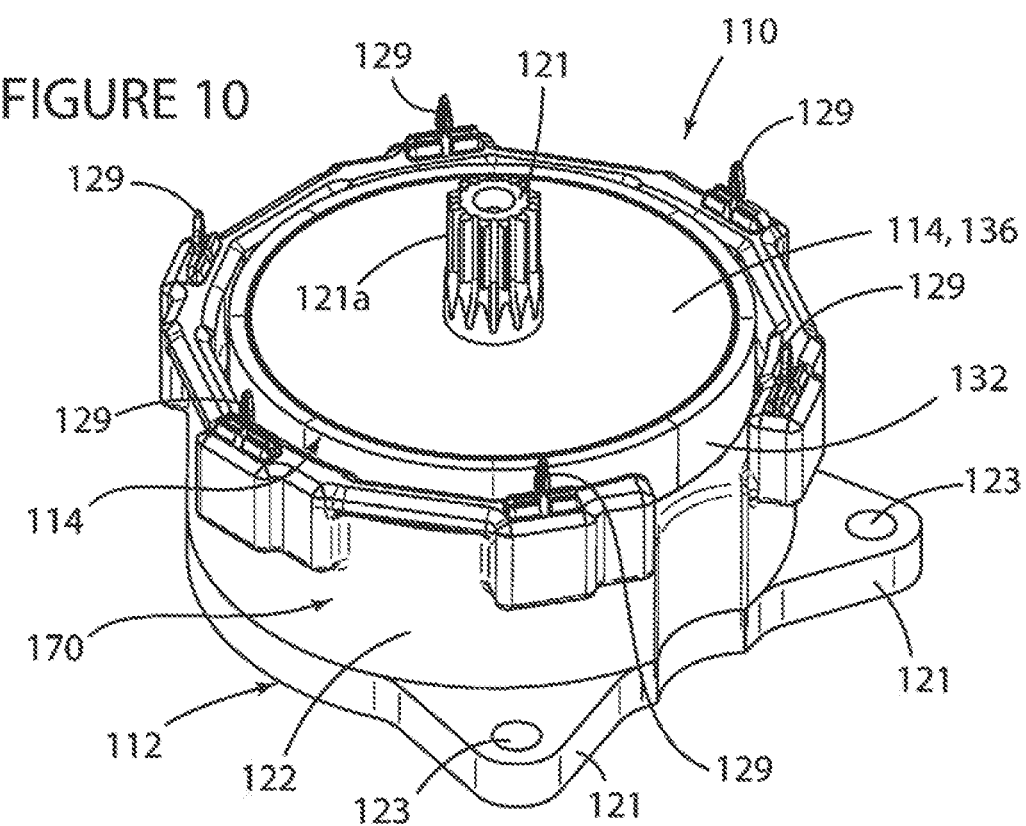
FIG. 10 is a perspective view of an embodiment of an axial brushless DC motor in accordance with the present invention with a stator over mold member.

FIG. 9 depicts an alternate series circuit schematic and arrangement for the axial motor 10 in which the coils have been arranged in the phases U, V, and W as shown in FIG. 7 with the two coils 28 defining the U phase connected in series, the two coils 28 defining the V phase connected in series, and the two coils 28 defining the W phase connected in series.

The series circuit arrangement of FIG. 9 is advantageous in higher voltage, for example 24 V, applications while the parallel circuit arrangement of FIG. 8 is advantageous in lower voltage, for example 12 V, applications.

FIGS. 10, 11, 12, and 13 depict another embodiment of an axial brushless DC motor 110 in accordance with the present invention which comprises a stator assembly 112, a rotor assembly 114, a pair of ring shaped thrust/radial bearings 118 and 120, and an elongate motor shaft 121. In the embodiment shown, the axial brushless DC motor 110 is a three phase, six pole, axial brushless DC motor.

The stator assembly 112 includes a flat base or armature 122 in the form and shape of a disc defining a central through-hole or aperture 124, and a plurality of motor mounting brackets 121 each defining at least one motor mounting through-hole 123. In the embodiment shown, the base 122 may be made from a powder metal. A plurality of metal stator armature posts 125, namely six in the embodiment shown, protrude unitarily upwardly and outwardly from the interior face of the base 122. In the embodiment shown, the posts 125 are generally triangular in shape and extend full circle around the central through-hole or aperture 124 in a spaced apart relationship relative to each other and the central through-hole or aperture 124. Also, in the embodiment shown, the respective side faces 125a and 125b of each of the posts 125 (FIG. 12) converge inwardly towards each other and in the direction of the central through-hole or aperture 124.

The stator assembly 112 also includes a plurality of elongate thermoplastic bobbins 126 each defining a central elongate core or spool 127 defining a central elongate through-hole 127a. The central elongate core or spool 127 is of a triangular shape complementary with the triangular shape of the respective armature posts 125.

An electrical metal coil pack 128 extends and is wound around the exterior face of the core or spool 127 of each of the bobbins 126. Each of the coil packs 128 includes a pair of bent distal terminal ends 128a and 128b positioned in a side-by-side and spaced relationship relative to each other and adapted to extend through the interior of respective hollow and side by side and spaced bobbin connectors 126a and 126b formed at the top of each of the bobbins 126.

The stator assembly 112 further includes a plurality of, namely six in the embodiment shown, electrical metal terminals 129 adapted for electrical coupling and connection to the distal end 128a of each of the six coils 126 respectively.

The stator assembly 112 still further includes a generally ring shaped electrical metal shorting bar or ring 131 that includes a plurality of, namely six in the embodiment shown, spaced apart and circumferentially extending electrical metal terminals 131b unitary with the shorting ring 31 and adapted for electrical coupling and connection to the distal terminal end 128b of each of the six coil packs 126 respectively.

The stator assembly 112 still further comprises a thermoplastic stator over mold member 170 including a central elongated and generally cylindrically shaped hollow core or tube 172 defining an interior elongate cylindrical through-aperture or hole 140, an upper peripheral collar 175 defining an interior receptacle or housing 175a, an upper interior collar 144 surrounding the tube 172 and defining an upper ring shaped interior bearing receiving shoulder or pocket or nest 178 defined in the interior of the tube 172, and a lower collar 142 defining a lower interior bearing receiving shoulder or pocket or nest 180.

The rotor assembly 114 includes a generally disc and cup shaped magnet 132 including a disc shaped base 131 defining a central through-hole or aperture 134 and a peripheral and circumferentially extending and upstanding wall or lip or rim 135 together with the base 131 defining an interior metal pole piece receptacle 137.

A washer shaped metal pole piece 136 is adapted to be located and seated in the interior receptacle 137 of the magnet 132 in a relationship with the lower exterior surface of the pole piece 136 seated and abutted against the upper exterior surface of the base 131 and an exterior side surface abutted against the interior exterior side surface of the rim 135 of the magnet 132. In the embodiment shown, the pole piece 136 is in the form and shape of a disc or washer and defines a central through-hole or aperture 138 having a diameter less than and spaced from the central through-hole or aperture 134 defined in the magnet 132. The magnet 132 may be made of compression bonded Neo Ferrite magnetic material and is comprised of a plurality of alternating N-S poles.

The elongate and generally cylindrically shaped motor shaft 121 includes a pair of opposed distal ends 121a and 121b with the distal end 121a defining a plurality of circumferentially extending exterior teeth and an interior circumferentially extending shoulder 121c.

The various elements of the axial motor 110 are assembled and coupled together as described in more detail below.

Initially, the respective bobbins 126 with the respective electrical coil packs 128 wound thereon are slid onto the respective stator armature posts 125. The respective terminals 129 are then inserted into the interior of the respective bobbin connectors 126a and coupled to the respective distal ends 128a of the respective coils 128. The shorting ring 131 is then seated against the top of the bobbins 126 in a relationship with the respective terminals 131b of the shorting ring 131 inserted into the interior of the respective bobbin connectors 126b and coupled to the respective distal ends 128b of the respective coil packs 128.

The stator member 170 is then over molded onto the stator assembly 112 via an injection molding or the like process in a relationship with the central core or tube 172 defined by the over mold material extending through the center of the stator assembly 170 and the remaining thermoplastic over mold material surrounding and enveloping the exterior side surfaces of the respective bobbins 126, the bobbin connectors 126a and 126b, the coils 128, and all of the exterior surfaces of the shorting ring 131.

In accordance with the present invention, the use of an over molded stator member 170 with a central hollow bearing sleeve bushing or tube 172 with respective collars 144 and 142 defining respective upper and lower bearing receiving pockets or nests 178 and 180 advantageously reduces the cost of the motor 110, simplifies the motor assembly process, minimizes stack up tolerances, and secures the bobbins 126, coils 128, terminals 129, and the shorting ring 131 against vibration and increases thermal conductivity.

The rotor assembly 114 is then assembled as follows: the bearing 118 is seated in the interior of the collar 144 and the top bearing pocket 178 defined in the sleeve 172 of the stator over mold member 170; the magnet 132 is inserted and seated in the top recess or receptacle or housing 175a defined in the stator over mold member 170 in a relationship surrounding and spaced from the bearing 118; the pole piece 136 is inserted and seated in the interior of the magnet 132 in a relationship with the lower exterior surface of the pole piece 136 seated and abutted against the top exterior surface of the bearing 118; the motor shaft 121 is inserted through the motor 110 successively through the central through-holes defined in the pole piece 136, the magnet 132, the bearing 118, the stator over mold member 170, and the stator assembly 112 into a relationship wherein the bearing 118 is interference fitted around the distal end 121a of the motor shaft 121 and the opposed distal end 121b of the motor shaft 121 is located in the central through-hole 124 defined in the stator armature 122.

The lower bearing 120 is then inserted into the through-hole defined in the stator armature 122 and into the collar 142 and the lower stator over mold member pocket or nest 180 into a relationship surrounding and interference fitted to the distal end 121b of the motor shaft 121.

The respective bearings 118 and 120 are similar in structure and function to the bearings 20, 20a, and 20b and thus the earlier description of the elements and features and function of the bearings 20, 20a, and 20b is incorporated herein by reference with respect to the bearings 118 and 120 and thus it is understood that the respective bearings 118 and 120 include respective bearing stacked races 162 and 164 corresponding in structure to the respective races 62 and 64 of the bearing 20.

Figure 11:
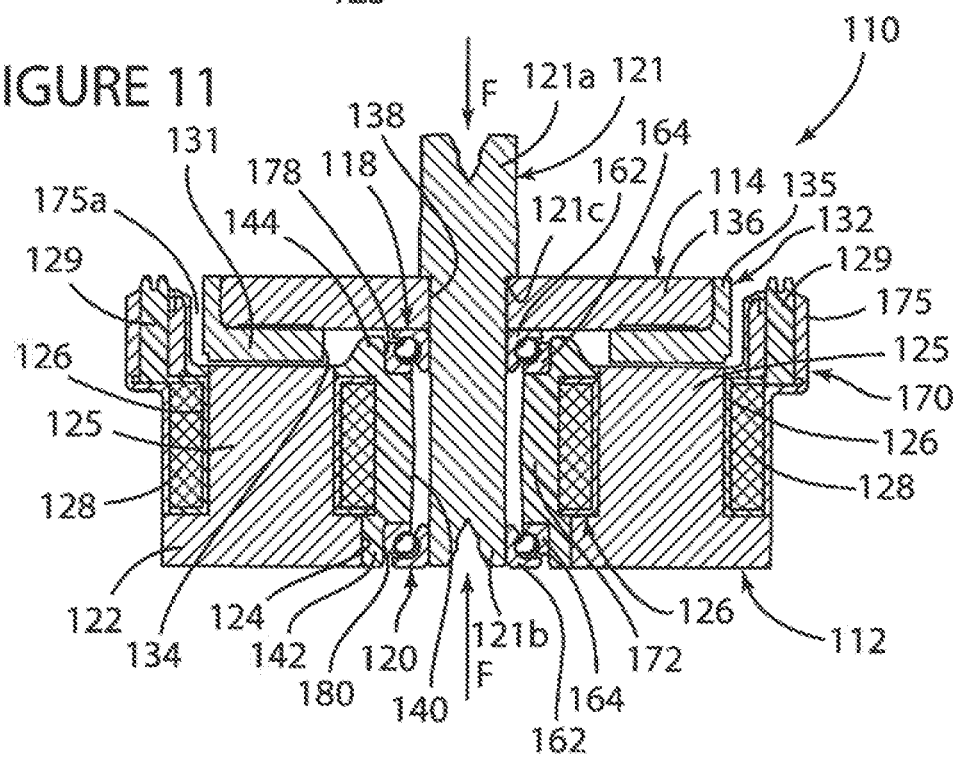
FIG. 11 is a vertical cross-sectional view of the axial brushless DC motor shown in FIG. 10.
Figure 12:
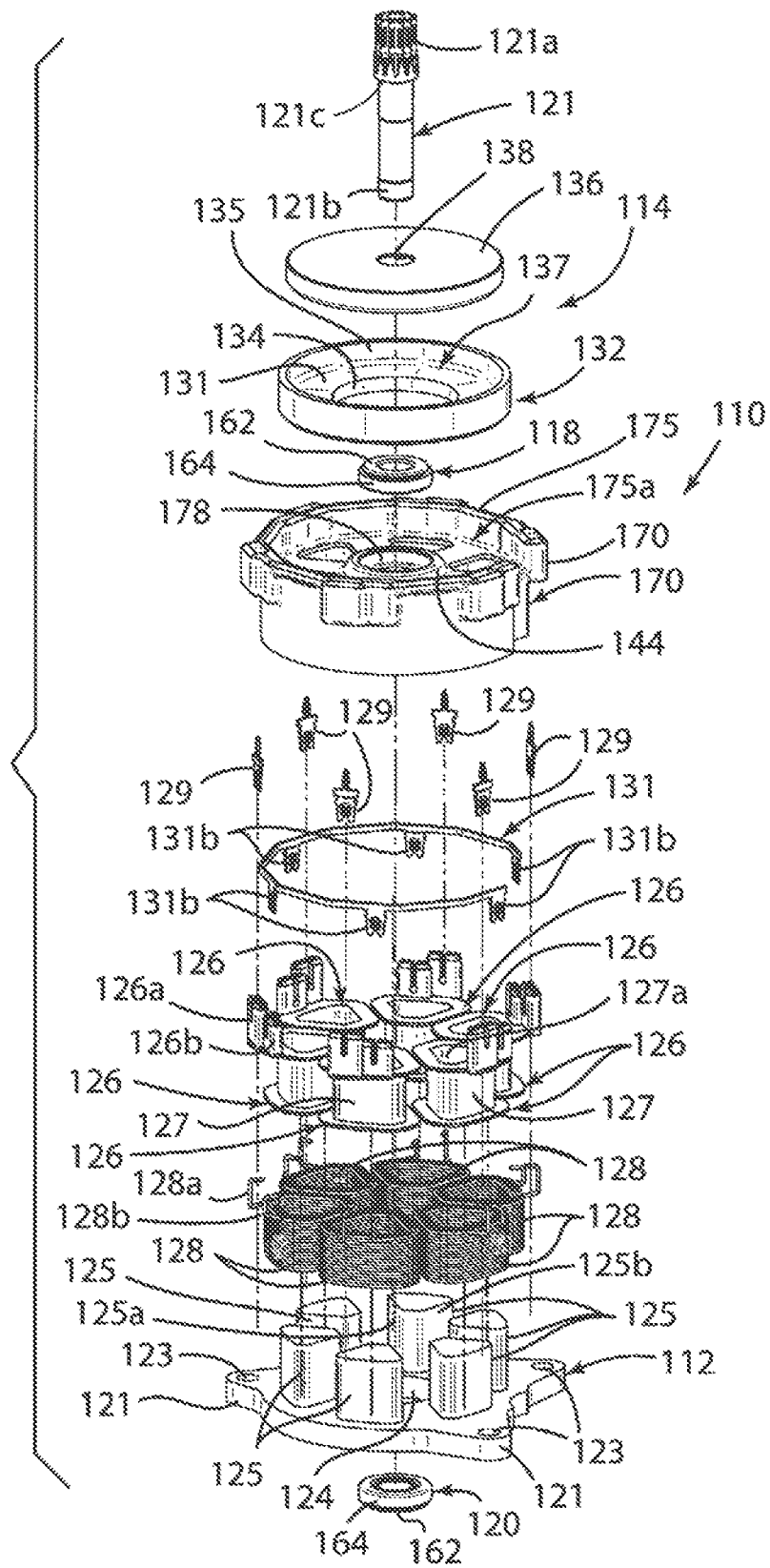
FIG. 12 is an exploded perspective view of the axial brushless DC motor shown in FIG. 10.
Figure 13:
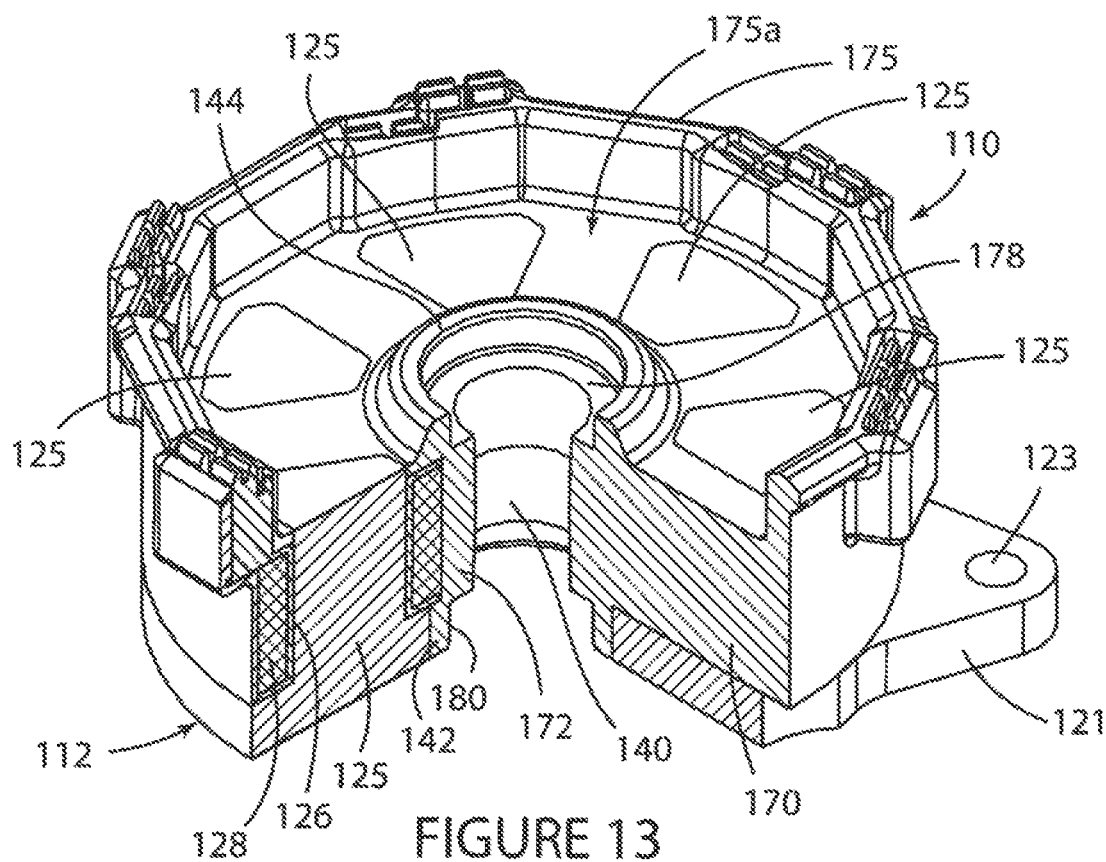
FIG. 13 is a part perspective, part vertical cross-sectional view of the axial brushless DC motor shown in FIG. 10.

In accordance with the present invention, the thrust and/or radial bearings 118 and 120 are mounted in the motor 110 and, more specifically, are mounted in the respective opposed and spaced apart collars 144 and 142 defined in the sleeve bushing defined by the central tube 172 of the stator over mold member 170 in an opposed, spaced apart, and back to back relationship, and still more specifically in a relationship with the respective races 164 of the respective bearings 118 and 120 in an opposed, spaced apart, and back to back relationship, to allow the bearings 118 and 120 to take up the axial forces, generally designated with the arrows F in FIG. 11, which are applied to the motor 110 and the motor shaft 121.

More specifically, the thrust and/or radial bearings 118 and 120 mount the motor shaft 121 in the axial motor 110 for radial movement and rotation with the rotor assembly 114 relative to the stator assembly 112; the top bearing 118 mounts the top portion or end of the motor shaft 121 to the stator assembly 112 for rotation relative to the stator assembly 112 and prevents the downward axial sliding or movement of the motor shaft 121 in the motor 110 in response to the application of a downward axial force F on the motor shaft 121 as shown in FIG. 11; and the lower bearing 120 mounts the lower portion or end of the motor shaft 121 to the stator assembly 112 for rotation relative to the stator assembly 112 and prevents the upward axial sliding or movement of the motor shaft 121 in the motor 110 in response to the application of an upward axial force F on the motor shaft 121 as shown in FIG. 11.

The bearings 118 and 120 are also adapted to take up some of the radial forces and can be of the same or different size or style depending upon the particular motor application.

Figure 14:
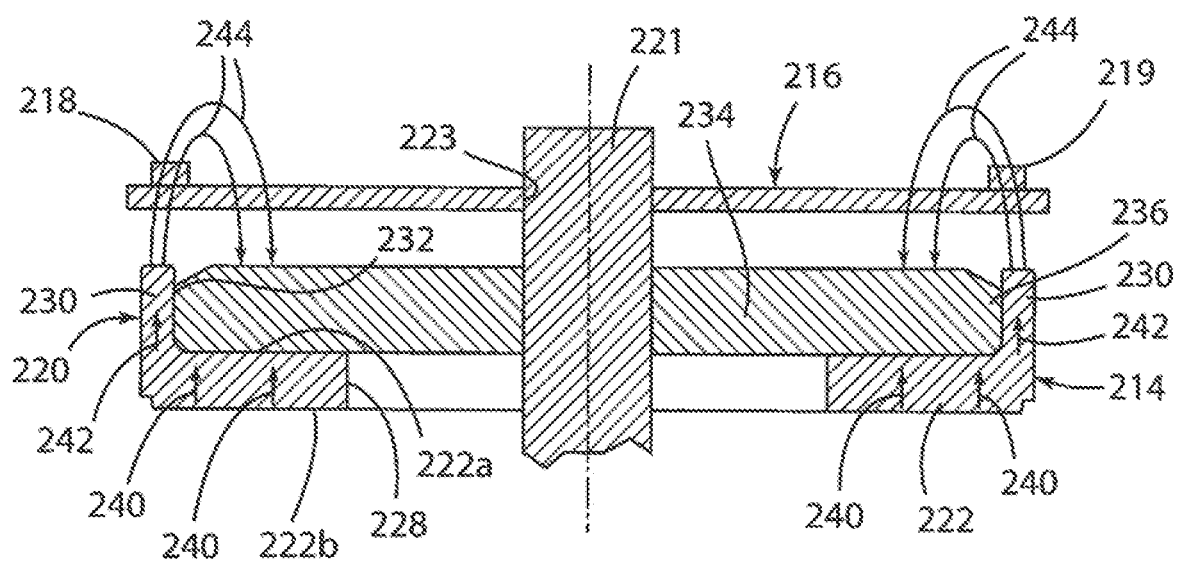
FIG. 14 is a vertical cross-sectional view of the axial brushless DC motor in accordance with the present invention with a cupped rotor magnet.

FIG. 14 depicts an alternate embodiment of a rotor 214 for the axial brushless motors 10 and 110.

The rotor 214 is comprised of a generally cup or bowl shaped magnet 220 that is made from a suitable magnetic material and includes a generally flat and disc shaped base 222 with opposed top and bottom exterior surfaces 222a and 222b respectively and defining a central aperture or through-hole 228. The magnet 220 additionally includes a peripheral and circumferentially extending wall or lip or rim 230 extending unitarily outwardly and upwardly from the peripheral top exterior surface 222a of the base 222 of the magnet 220 to define a generally cup or bowl shaped magnet 220 defining an interior cavity or receptacle 232. In the embodiment shown, the magnet 220 is a multi-pole magnet and more specifically an eight pole magnet.

The rotor 214 further includes a generally washer shaped metal pole piece 234 that is seated in the magnet 220 and, more specifically, a metal pole piece 234 seated in the interior cavity or receptacle 232 of the cupped magnet 220 in a relationship with the bottom exterior surface of the pole piece 234 seated and abutted against the top exterior surface 222a of the base 222 of the magnet 220 and the side exterior surface of the pole piece 234 abutted against the interior face of the circumferential wall or lip 230 of the magnet 220.

In the embodiment show, a circumferentially extending magnet flux notch or angled exterior surface 236 is formed and defined in a top peripheral edge of the magnet pole piece 234.

Although not described or shown in this patent application in any detail, it is understood that the motors 10 and 110 in accordance with the present invention are adapted for use in an actuator or the like (not shown) including a flat integrated circuit board 216 as shown in FIG. 14 mounted in a horizontal relationship overlying and spaced from and parallel to the top exterior surface of the motor rotor 214. The printed circuit board 216 includes a magnetic flux field sensor mounted thereon which, in the embodiment shown, is in the form of Hall Effect switches/latches 218 and 219 mounted to the top exterior surface of the printed circuit board 216. Other required electronic components (not shown) are also adapted to be mounted to the top and/or bottom exterior surfaces of the printed circuit board 216 and adapted for sensing magnetic flux magnitude and/or direction. The motor shaft 116 extends through an aperture 223 in the printed circuit board 216.

In the embodiment shown, the rotor 214, and more specifically the cupped magnet 220, is positioned in a relationship with the wall or lip 230 of the magnet 220 positioned vertically co-linearly with and spaced from the Hall Effect switches/latches 218 and 219 mounted on the top exterior surface of the printed circuit board 216 and still more specifically in a relationship with the wall or lip 230 of the magnet 220 positioned in a relationship generally normal with and spaced from the bottom exterior surface of the printed circuit board 216.

As shown in FIG. 14, the magnet 220 generates a magnetic flux field that includes a plurality of components or segments including a first magnetic flux field component or segment or field generally designated by the arrows 240 that travels generally vertically upwardly through the body of the base 222 of the magnet 220 in a relationship generally normal to the opposed exterior surfaces 222a and 222b of the magnet base 222; a second magnetic flux field component or segment or field generally designated by the arrows 242 that travels vertically upwardly from the top of the base 222 of the magnet 220 into and vertically upwardly through the body of the peripheral rim 230 of the magnet 220; and a third magnetic flux field component or segment generally designated by arrows 244 that travels vertically upwardly from the top of the rim 230 of the magnet 220 through the gap between the magnet 220 and through the printed circuit board 26 and then through the area or region of the Hall Effect switches/latches 218 and 219 mounted on the top exterior surface of the printed circuit board 216.

In accordance with the present invention, the positioning of the magnet pole piece 234 in the interior of the magnet 220 in relationship with the notch 236 in the pole piece 234 located adjacent and opposed the interior face of the rim 230 of the magnet 220 enhances the density of the magnetic flux field in the area or region of the top of the rim 230 and, more specifically, allows more of the magnetic flux field to travel out and away from the peripheral rim 230 of the magnet 220 and through the Hall Effect switches/latches 218 and 219.

Numerous variations and modifications of the axial brushless DC motor described above may be effected without departing from the spirit and scope of the novel features of the invention. It is thus understood that no limitations with respect to the structure of the axial brushless DC motor illustrated herein is intended or should be inferred. It is, of course, intended to cover by the appended claims all such modifications as fall within the scope of the claims.

We claim:

1. An axial brushless DC motor comprising:
a stator including a plurality of coils;
a rotor including a disc-shaped base and a disc-shaped magnet defining an interior and coupled to the disc-shaped base, each of the disc-shaped base and the disc-shaped magnet defining a through-aperture;
an elongate sleeve extending through the stator, the sleeve defining an interior through-aperture and a distal collar;
a stator over mold member surrounding and enveloping the exterior side surfaces of the coils of the stator and including a central elongated hollow tube defining the sleeve and the interior through-aperture and the distal collar of the sleeve, the stator over mold member further including an upper peripheral collar defining an interior receptacle, the disc-shaped magnet being seated in the interior receptacle of the stator over mold member and surrounded by the upper peripheral collar of the stator over mold member, the disc-shaped pole piece being seated in the interior of the disc-shaped magnet;
an elongate shaft extending through the interior through-aperture of the disc-shaped base, the disc-shaped magnet, and the sleeve of the stator over mold member; and
a bearing in the distal collar of the elongate sleeve of the stator over mold member for allowing the rotation of the shaft relative to the sleeve and the stator.

2. The axial brushless DC motor of claim 1, wherein the stator over mold member defines a housing for the rotor.

3. The axial brushless DC motor of claim 1, further comprising a stator shorting ring including respective terminals coupled to the respective coils.

4. The axial brushless DC motor of claim 1, wherein the plurality of coils are arranged in respective pairs of coils connected in parallel.

5. The axial brushless DC motor of claim 1, wherein the plurality of coils are arranged in respective pairs of coils connected in series.

6. The axial brushless DC motor of claim 1, wherein the magnet is the form of a cup and the base defines a disc-shaped pole piece seated in the interior of the cup.

7. The axial brushless DC motor of claim 1 further comprising a magnetic flux sensor, the magnet of the rotor including a rim and adapted to generate a magnetic flux, the magnetic flux being adapted to travel through the rim of the magnet and the magnetic flux sensor.

8. The axial brushless DC motor of claim 1 wherein the magnet is in the form of a cup including the rim and defining a receptacle for the base defining a metal pole piece, the metal pole piece defining a notch in a peripheral region thereof located adjacent the rim of the magnet for enhancing the density of the magnetic flux in the region of the rim of the magnet and the magnetic flux sensor.

9. An axial brushless DC motor comprising:
a stator including a plurality of coils;
a stator over mold member surrounding and enveloping the exterior side surfaces of the coils of the stator and including a central elongated hollow tube defining an interior elongate through-aperture, the stator over mold member further including an upper peripheral collar defining an interior receptacle;

a rotor including a magnet seated in the interior receptacle defined by the stator over mold member and surrounded by the upper peripheral collar of the stator over mold member;

an elongate shaft extending through the through-aperture of the tube of the stator over mold member; and the magnet being in the form of a cup including a base and a peripheral lip together defining a receptacle for a disc-shaped pole piece, the disc-shaped pole piece being separate from the magnet, the base of the magnet defining a through-hole and the disc-shaped pole piece defining a through-hole and seated against the base of the cup and surrounded by the peripheral lip of the magnet, the elongate shaft extending through the through-hole in the base of the magnet and the disc-shaped pole piece respectively.

* * * * *